(12) United States Patent
DiPalma et al.

(10) Patent No.: US 11,794,887 B1
(45) Date of Patent: Oct. 24, 2023

(54) REMOVABLE TRAILING EDGE ASSEMBLY AND SYSTEM FOR ROTOR BLADE TRAILING EDGE ACTUATION

(71) Applicant: LOCKHEED MARTIN CORPORATION, Bethesda, MD (US)

(72) Inventors: Matthew Walter DiPalma, Bridgeport, CT (US); Timothy James Conti, Shelton, CT (US); Claude George Matalanis, Monroe, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/714,572

(22) Filed: Apr. 6, 2022

(51) Int. Cl.
| | |
|---|---|
| *B64C 27/467* | (2006.01) |
| *B64C 27/64* | (2006.01) |
| *B64C 27/57* | (2006.01) |
| *B64C 27/473* | (2006.01) |

(52) U.S. Cl.
CPC ......... *B64C 27/467* (2013.01); *B64C 27/473* (2013.01); *B64C 27/57* (2013.01); *B64C 27/64* (2013.01)

(58) Field of Classification Search
CPC ...... B64C 27/467; B64C 27/473; B64C 27/57
See application file for complete search history.

(56) References Cited

U.S. PATENT DOCUMENTS

| | | | |
|---|---|---|---|
| 2,716,460 A * | 8/1955 | Young | B64C 27/615 244/214 |
| 6,168,379 B1 | 1/2001 | Bauer | |
| 6,267,331 B1 * | 7/2001 | Wygnanski | B64C 27/467 244/35 R |
| 7,632,068 B2 * | 12/2009 | Bak | F03D 1/0641 416/132 B |
| 8,647,059 B1 | 2/2014 | Szefi | |
| 9,623,965 B2 * | 4/2017 | Eglin | B64C 5/18 |
| 10,435,150 B1 | 10/2019 | Szefi | |
| 10,507,909 B2 * | 12/2019 | Cave | B64C 27/82 |
| 2021/0323660 A1 | 10/2021 | Caputo et al. | |

\* cited by examiner

*Primary Examiner* — Michael L Sehn
(74) *Attorney, Agent, or Firm* — Foley & Lardner LLP

(57) ABSTRACT

A rotor blade assembly for a rotary wing aircraft includes a main rotor blade body comprising an upper blade skin, a lower blade skin, an inboard end, an outboard end, and a trailing edge. The rotor blade assembly further includes a trailing edge actuator assembly. The trailing edge actuator assembly includes an upper actuator skin and a lower actuator skin defining a cavity and a trailing edge flap, a control panel disposed in the cavity and coupled to one of the upper actuator skin or the lower actuator skin and one or more actuators disposed in the cavity and configured to apply force to the control panel to cause the trailing edge flap to deflect. The trailing edge actuator assembly is coupled to the trailing edge of the main rotor blade body.

19 Claims, 7 Drawing Sheets

REMOVABLE TRAILING EDGE ASSEMBLY AND SYSTEM FOR ROTOR BLADE TRAILING EDGE ACTUATION

STATEMENT REGARDING FEDERALLY SPONSORED RESEARCH OR DEVELOPMENT

This invention was made with Government support under Agreement No. W911W6-20-2-0003, awarded by the U.S. Army Research Development and Engineering Command. The Government has certain rights in the invention.

BACKGROUND

The present invention relates generally to the field of actuated rotor blades for rotary wing aircraft.

Rotary wing aircraft, such as helicopters, may operate across disparate flight regimes. Two of the most common operating conditions are hover and high-speed flight. The selection and design of the rotor blade shape may be based in part on taking these operating conditions into account.

SUMMARY OF THE INVENTION

In an exemplary aspect, a rotor blade assembly for a rotary wing aircraft is provided. The rotor blade assembly includes a main rotor blade body comprising an upper blade skin, a lower blade skin, an inboard end, an outboard end, and a trailing edge. The rotor blade assembly further includes a trailing edge actuator assembly. The trailing edge actuator assembly includes an upper actuator skin and a lower actuator skin defining a cavity and a trailing edge flap, a control panel disposed in the cavity and coupled to one of the upper actuator skin or the lower actuator skin and one or more actuators disposed in the cavity and configured to apply force to the control panel to cause the trailing edge flap to deflect. The trailing edge actuator assembly is coupled to the trailing edge of the main rotor blade body.

In a further exemplary aspect, a rotary wing aircraft is provided. The rotary wing aircraft includes an engine configured to be coupled to a fuselage and a main rotor system coupled to the fuselage. The main rotor system includes a rotor hub configured to be rotated by the engine about an axis, at least one rotor blade connected to the rotor hub, the at least one rotor blade having a main blade body and a main blade body trailing edge, and an actuator assembly coupled to the main body trailing edge of each of the at least one rotor blade. Each actuator assembly includes an actuator assembly trailing edge configured to deflect upward and downward, a pivot member coupled to the actuator assembly trailing edge in an internal portion of the actuator assembly, and one or more inflatable diaphragms configured to apply pressure to the pivot member when inflated. The pressure applied to the pivot member imparts torque on the actuator assembly trailing edge causing the actuator assembly trailing edge to deflect relative to the main blade body.

In yet a further exemplary aspect, a control system for actuating a trailing edge of a rotor blade of a rotary wing aircraft is provided. The control system includes a trailing edge control panel disposed in a cavity of the rotor blade and coupled to the trailing edge of the rotor blade, one or more actuators configured to adjust a position of the control panel so as to cause deflection of the trailing edge and a controller. The controller is configured to receive either or both of (i) sensor data from one or more sensors or (ii) operator inputs from one or more operator controls; determine, based on the at least one of sensor data or operator inputs, a change in a flight regime of the rotary wing aircraft; control, in response to detecting a change in flight regime from a forward flight regime to a hover regime, the actuators to cause the trailing edge to deflect downward; and control, in response to detecting a change in flight regime from the hover regime to the forward flight regime, the actuators to cause the trailing edge to deflect upward.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods and apparatuses for providing a rotor blade assembly with trailing edge actuation. The various concepts introduced above and discussed in greater detail below may be implemented in any of a number of ways, as the described concepts are not limited to any particular manner of implementation. Examples of specific implementations and applications are provided primarily for illustrative purposes.

As noted above, the rotor blade shape may be designed or selected taking into account aspects of a flight regime. For example, a rotor intended primarily for hovering may have blades featuring a moderate negative geometric twist rate along the blade span. Such a twist distribution induces a highly efficient inflow distribution throughout the rotor disk. On the contrary, a rotor intended primarily for high-speed flight may generally feature blades that are relatively untwisted. When highly-twisted blades are implemented for high-speed flight, the advancing blade tip tends to produce negative lift, and the rotor experiences higher vibratory loads. Therefore, a preferable design for a hovering rotor blade is different from a blade better suited for high-speed flight.

Traditional rotor blades are generally designed for a hover flight regime, resulting in a suboptimal airfoil shape for high-speed flight. Accordingly, a rotor blade assembly configured to adjust the shape of the airfoil to increase twist in the hover regime and decrease twist in the high-speed flight regime is desirable. Rotor blades that can morph between a twisted state and an untwisted state (e.g., rotors that can perform active blade twist) have been attempted. However, twisting the entire blade either requires the blade to be more torsionally compliant and less stiff than is preferable or requires very high-authority actuation and forcing large strains into a stiffer blade structure.

The exemplary non-limiting embodiments described herein employ a low-power pneumatic actuation system to actively deploy a trailing edge flap on the rotor blade. The aerodynamic effects of trailing edge flap deflection may correspond to or surpass those of active blade twist. Advantageously, flap deflection offers ease of implementation as compared to active blade twist, at least for some configurations. In some embodiments, the trailing edge flap may deflect downward in the hover regime and return to a neutral position during high-speed flight.

Figure 1:
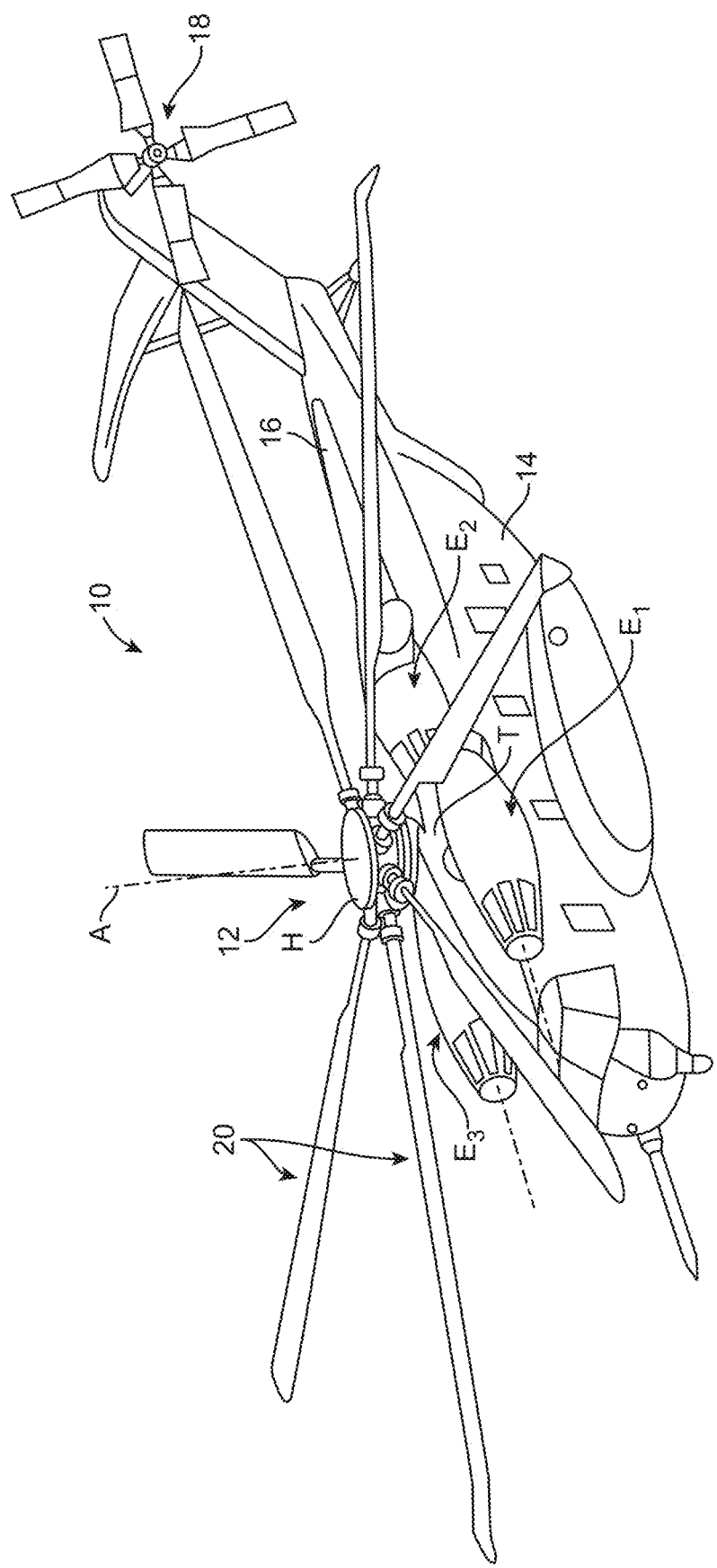
FIG. 1 is a perspective view of a rotary wing aircraft.

Referring to FIG. 1, an example of a vertical takeoff and landing (VTOL) rotary-wing aircraft 10 having a main rotor system 12, such as a helicopter, is illustrated. As shown, the aircraft 10 includes an airframe 14 having an extending tail 16 which mounts a tail rotor system 18, such as an anti-torque system. The main rotor system 12 is driven about an axis of rotation A via a main gearbox, illustrated schematically at T, by one or more engines, illustrated at E1-E3. The main rotor system 12 includes a plurality of rotor blade assemblies 20 mounted to a rotor hub assembly H. Although a particular helicopter configuration is illustrated and described herein, other configurations and/or aircraft may be utilized in connection with the concepts described herein. For example, the techniques according to the present disclosure may be implemented in a variety of aircraft, including a high speed compound rotary wing aircraft with supplemental translational thrust systems, a dual contra-rotating, coaxial rotor system aircraft, a turbo-prop aircraft, a tilt-rotor aircraft and a tilt-wing aircraft.

Figure 2:
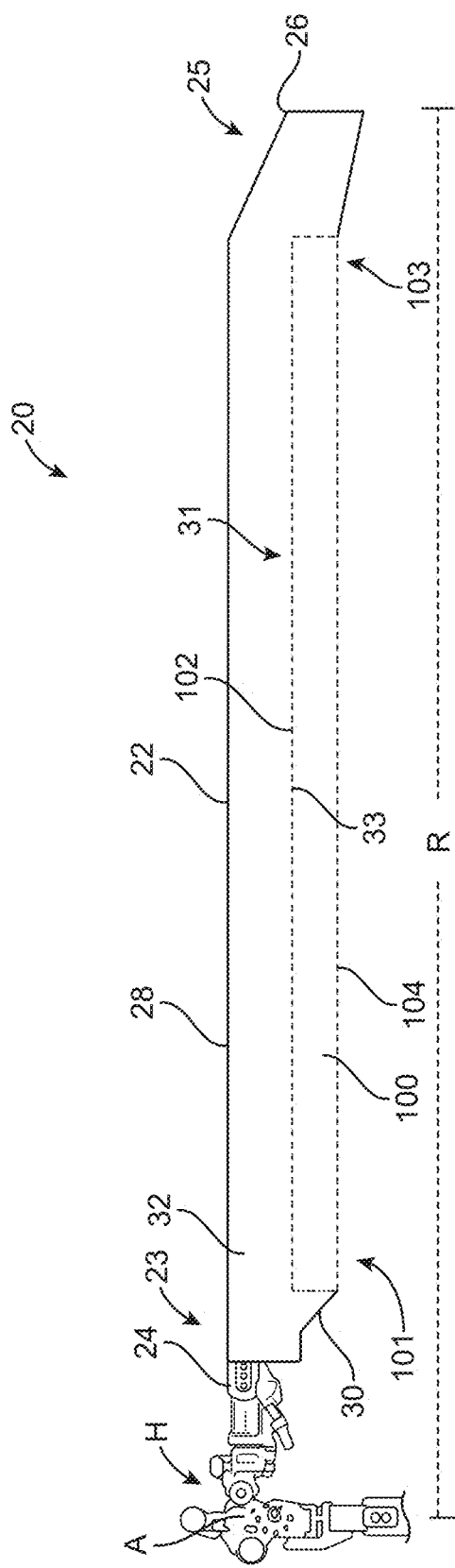
FIG. 2 is a plan view of a rotor blade assembly, according to an exemplary embodiment.

FIG. 2 illustrates a main rotor blade assembly 20 configured to rotate about the axis of rotation A, according to an exemplary embodiment. The main rotor blade assembly 20 includes a main rotor blade body 22 having an inboard end 23 arranged adjacent a root 24 configured to attach to the rotor hub H, an outboard end 25 including a tip 26 located at the radially outermost point of the main rotor blade body 22, and an intermediate section disposed between the inboard and outboard sections. A blade radius R is defined between the axis of rotation A and the blade tip 26.

Figure 3:
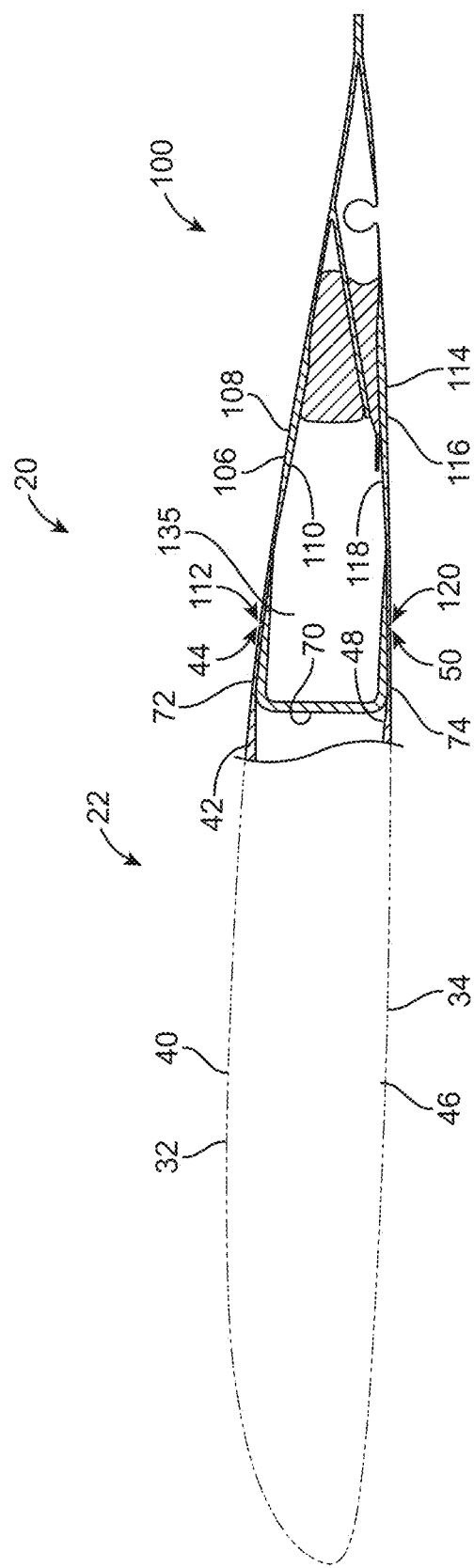
FIG. 3 is a partial cross-sectional view of a rotor blade assembly, according to an exemplary embodiment.
Figure 5:
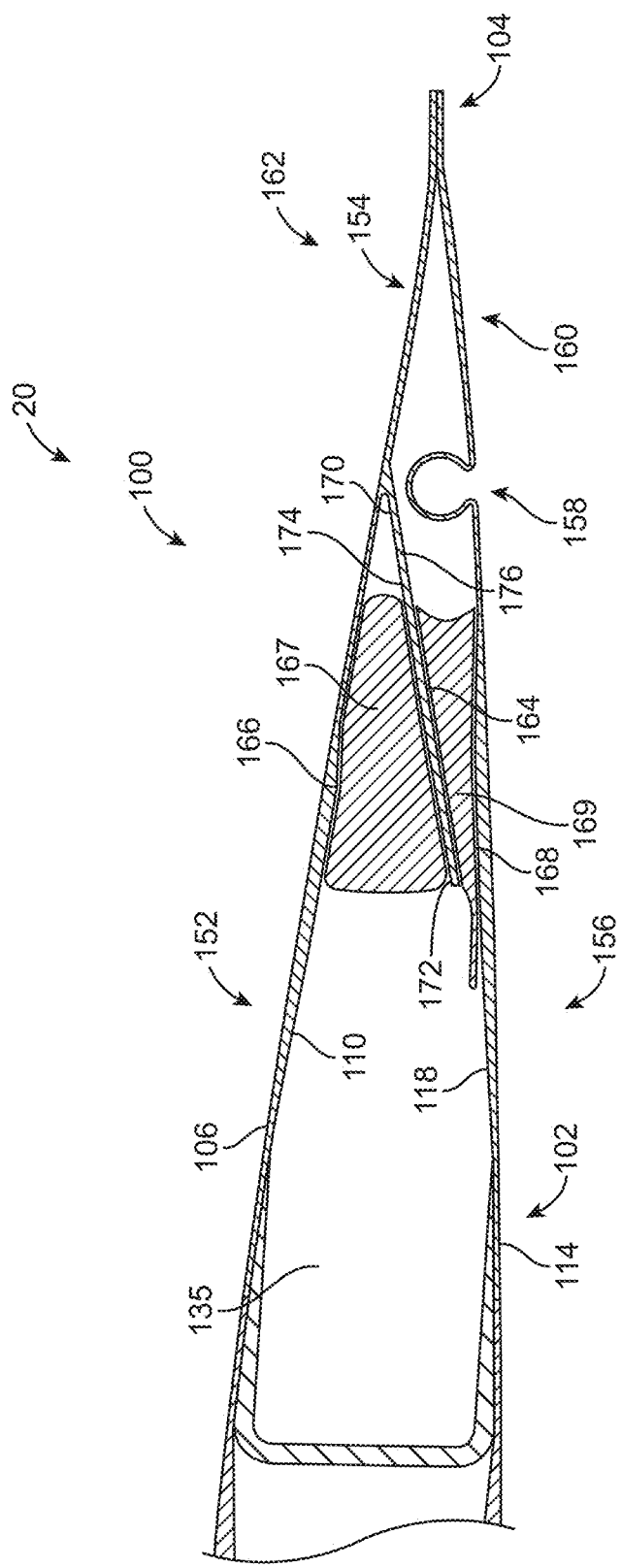
FIG. 5 is a partial cross-sectional view of a portion of the rotor blade assembly shown in FIG. 3, according to an exemplary embodiment.

The main rotor blade body 22 has a leading edge 28 and a trailing edge 30. As best shown in FIGS. 3 and 5, upper and lower blade skins 32, 34 define the upper and lower aerodynamic surface of the main rotor blade body 22. The trailing edge 30 includes a trailing edge cutout (e.g. an opening) 31 with a cutout mating edge 33. Main rotor blade body 22 may, for example, be manufactured with the trailing edge cutout 31 or may be initially manufactured without the cutout 31 and a portion of the main rotor blade body 22 may be removed to form the cutout 31. The cutout 31 may span substantially the whole length of the main rotor blade body 22, from the inboard end 23 to the outboard end 25, or may span only a portion of the main rotor blade body 22. In various embodiments, the cutout 31 may extend toward the leading edge 28 more or less than as shown in FIG. 2. The main rotor blade assembly 20 includes a trailing edge actuator assembly 100 received in the trailing edge cutout 31. The trailing edge actuator assembly 100 includes an actuator leading edge 102 and an actuator trailing edge 104, as well as an inboard portion 101 and an outboard portion 103. The actuator leading edge 102 is coupled to the cutout mating edge 33. In various embodiments, the actuator trailing edge 104 may substantially align with a portion of the blade trailing edge 30. The trailing edge actuator assembly 100 may be approximately the same size as the cutout 31 so as to form a contiguous airfoil shape. The trailing edge actuator assembly may extend along at least a majority of main rotor blade body 22 from the inboard end 23 to the outboard end 25, or along a smaller portion thereof.

It should be understood that relative positional terms such as "forward," "aft," "upper," "lower," "above," "below," and the like are with reference to the normal operational attitude of an aircraft and should not be considered otherwise limiting.

Referring to FIG. 3, a section view of the main rotor blade assembly 20 is illustrated, according to some embodiments. The main rotor blade assembly 20 includes a stiffener 70 configured to couple the trailing edge actuator assembly 100 to the main rotor blade body 22 and to maintain a distance between the upper blade skin 32 and the lower blade skin 34. The distance corresponds to a predetermined clearance between the upper blade skin 32 and lower blade skin 34. The stiffener 70 may be made from any appropriate material used in rotary wing aircraft blades, including, for example, titanium, aluminum, stainless steel, carbon fiber, fiberglass or any combination thereof. For example, the stiffener 70 may be made from may be made from the same or similar materials as the actuator skins 106, 114. The stiffener 70 provides additional stiffness (e.g., by adding structural rigidity) to the main rotor blade assembly 20. The stiffener 70 is configured to maintain the upper and lower blade skins 32, 34 in position and separated. The upper blade skin 32 includes an upper skin outer surface 40, an upper skin inner surface 42, and an upper skin mating edge 44. The lower blade skin 34 includes a lower skin outer surface 46, a lower skin inner surface 48, and a lower skin mating edge 50. Together the upper skin mating edge 44 and the lower skin mating edge 50 form the cutout mating edge 33.

The stiffener 70 includes a stiffener upper surface 72 and a stiffener lower surface 74. In this example, the stiffener 70 has a C-shaped cross section, but other shapes and structures are contemplated, including, but not limited to, a stiffener 70 with an I-shaped cross section. The trailing edge actuator assembly 100 includes an upper actuator skin 106, comprising an upper outer surface 108, an upper inner surface 110 and an upper leading edge 112, and a lower actuator skin 114, comprising a lower outer surface 116, a lower inner surface 118, and a lower leading edge 120. Together, the upper leading edge 112 and lower leading edge 120 of the actuator assembly 100 form the actuator leading edge 102. The upper and lower outer surfaces 108, 116 define a portion of the airfoil of the rotor blade assembly 20. The upper and lower inner surfaces 110, 118 define an inner cavity 135 therebetween. The actuator skins 106, 114 may be made from any appropriate material used in rotary wing aircraft blades, including, for example, titanium, aluminum, stainless steel, carbon fiber, fiberglass or any combination thereof. The actuator skins 106, 114 may be made from the same or similar materials as the blade skins 32, 34.

The actuator assembly 100 and the main rotor blade body 22 are coupled together by the stiffener 70 such that the upper skin mating edge 44 meets the upper leading edge 112 of the upper actuator skin 106 and the lower skin mating edge 50 meets the lower leading edge 120 of the lower actuator skin 114. In some embodiments, the edges 44, 112, and 50, 120 may be in contact with each other, while in other embodiments, there may be a small gap between the edges 44, 112, and 50, 120. The upper blade skin 32 and the upper actuator skin 106 are coupled to the stiffener 70 such that the upper skin inner surface 42 and the upper inner surface 110 of the upper actuator skin 106 are in contact with the stiffener upper surface 72. The lower blade skin and the lower actuator skin 114 are coupled to the stiffener 70 such that the lower skin inner surface 48 and the lower inner surface 118 of the lower actuator skin 114 are in contact with the stiffener lower surface 74. The skins 32, 34, 106, 108 may be coupled to the stiffener 70 in various ways, including, but not limited to welding, bonding using epoxy, and fastening (e.g., with mechanical fasteners). For example, a first set of one or more fasteners may be configured to couple the upper actuator skin 106 to the stiffener 70 and a second set of one or more fasteners may be configured to couple the lower actuator skin 114 to the stiffener. In some embodiments, countersunk fasteners may be used such that the fastener heads are substantially coplanar with a respective outer surface 40, 46, 108, 116 of the skins 32, 34, 106, 114. In some embodiments, the countersunk fasteners do not extend beyond the outer surfaces 40, 46, 108, 116 of the skins 32, 34, 106, 114, thus enhancing the aerodynamic properties of the airfoil. The upper skins 32, may be coupled to the stiffener upper surface 72 such that the outer surfaces 40, 108 align to form a substantially contiguous upper airfoil surface, and the lower skins 34, 114 may be coupled to the stiffener lower surface 74 such that the outer surfaces 46, 116 align to form a substantially contiguous lower airfoil surface.

Figure 4:
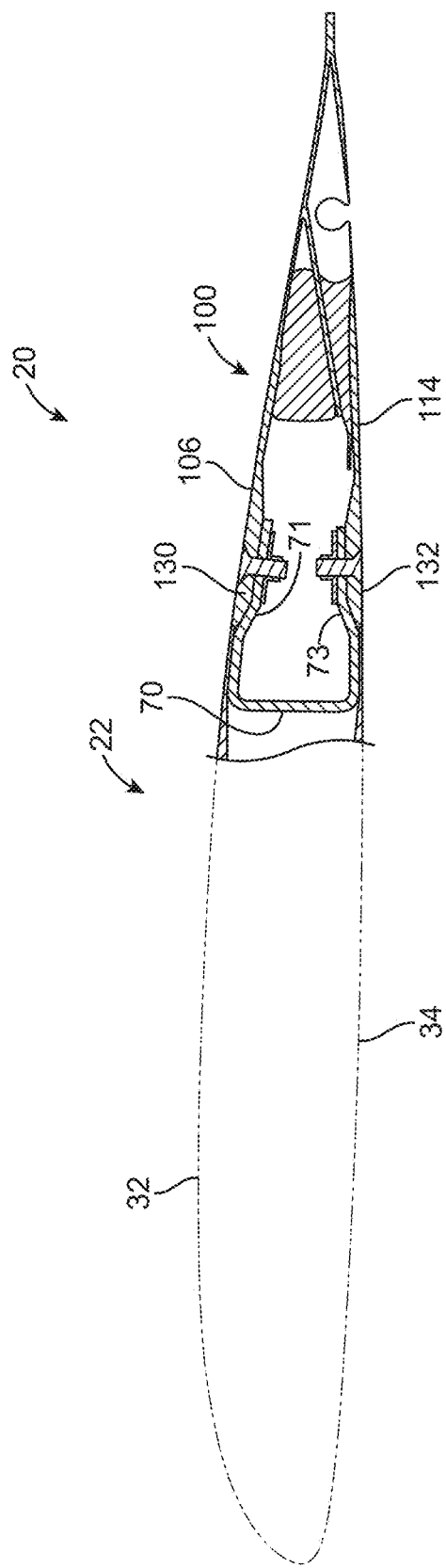
FIG. 4 is a partial cross-sectional view of a rotor blade assembly, according to an exemplary embodiment.
Figure 6:
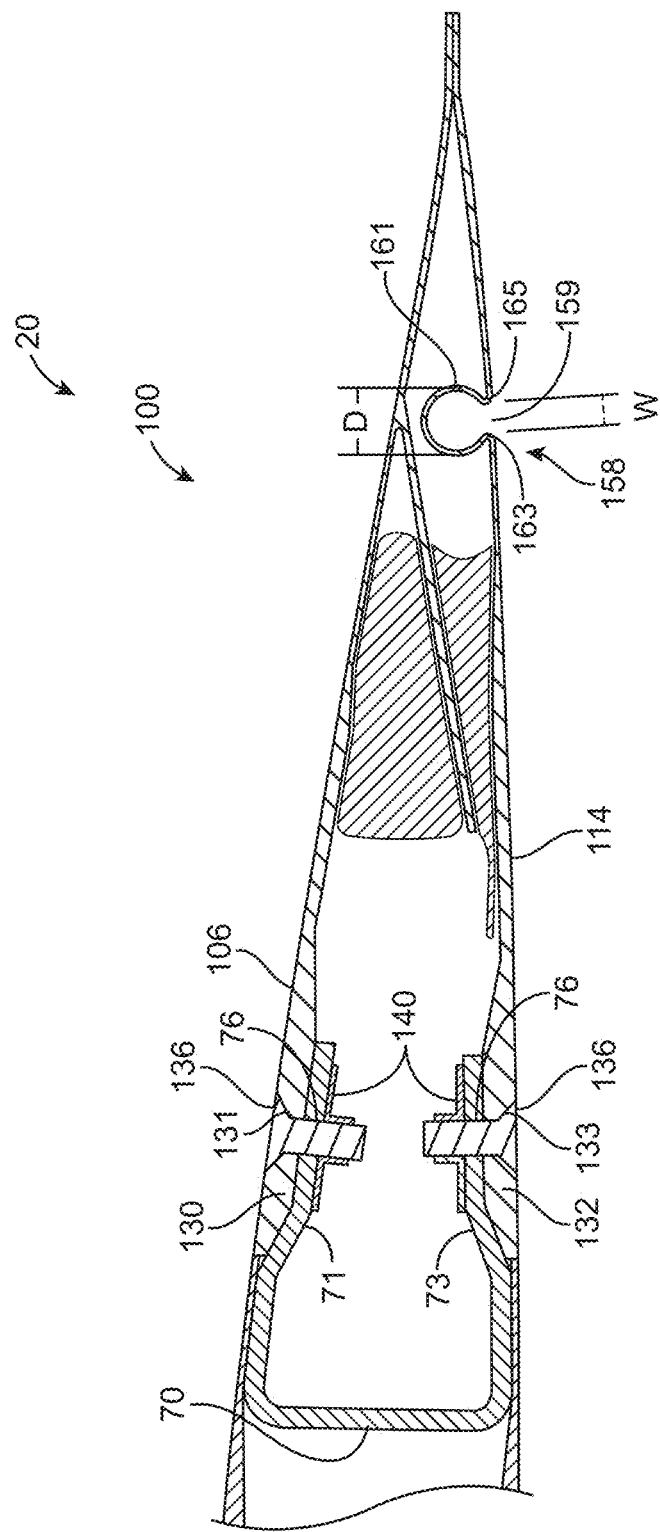
FIG. 6 is a partial cross-sectional view of a portion of the rotor blade assembly shown in FIG. 4, according to an exemplary embodiment.

Referring to FIG. 4, a section view of the main rotor blade assembly 20 is illustrated, according to some other embodiments. FIG. 6 shows a portion of FIG. 4, including the trailing edge actuator assembly 100, in more detail. The main rotor blade assembly 20 shown in FIGS. 4 and 6 is similar to the embodiment shown in FIG. 3, except that an alternative coupling arrangement is shown. In the example shown in FIGS. 4 and 6, the upper and lower actuator skins 106, 114 include respective thick portions 130, 132 each with one or more countersunk holes 131, 133. The stiffener 70 may have an alternatively shaped cross section to account for the thick portions 130, 132 of the skins 106, 114. The countersunk holes 131, 133 are each configured to receive a countersunk fastener 136. When installed, the upper surfaces of the countersunk fasteners may be substantially coplanar with and/or may not extend beyond the outer surfaces 108, 116 of the skins 106, 114. The countersunk fasteners may extend through holes 76 in the stiffener 70 and may be coupled to nuts 140 that contact upper and lower inner surfaces 71, 73 of the stiffener 70. For example, the holes 76 in the stiffener 70 may be through holes and the nuts 140 may be threaded such that the fasteners 136 pass through the holes 76 and are threaded into the nuts 140. In some embodiments the nuts 140 may be coupled (welded, bonded, etc.) to the inner surfaces 71, 73 of the stiffener 70. In some embodiments, the nuts 140 and holes 76 may both be threaded. For example, the fasteners 136 may be threaded into the holes 36 and the nuts 140 may act as jam nuts or lock nuts. In other embodiments, the nuts 140 may be coupled to the stiffener 70 and the nuts 140 and holes 76 may form a continuous threaded portion.

Referring to FIG. 5, a section view of the trailing edge actuator assembly 100 shown in FIG. 3 is illustrated in more detail, according to some other embodiments. The upper actuator skin 106 may include a first portion 152 and an upper flap portion 154. The lower actuator skin may include a first portion 156, a hinge portion 158, and a lower flap portion 160. Together, the upper flap portion 154 and the lower flap portion 160 form the trailing edge flap 162. The upper actuator skin 106 and the lower actuator skin 114 may converge toward each other as they extend toward the tailing edge 104 and may be coupled together at the trailing edge. The trailing edge flap 162 is configured to deflect upward or downward depending on the flight regime of the aircraft 10. For example, the trailing edge flap 162 may deflect downward when the aircraft 10 is hovering and may return to a neutral position or deflect upward when the aircraft 10 is in high-speed flight.

The lower actuator skin 114 may include a hinge portion 158 to allow for increased deflection of the trailing edge flap 162. The shape of the hinge portion 158 shown in the figures is an example and is not intended to be limiting. Other designs that increase compliance of the trailing edge flap 162 while decreasing local strain on the upper and lower actuator skins 106, are also contemplated. In the non-limiting example shown in the figures, the cross-section of the hinge portion 158 is shown in the shape of the Greek capital letter Omega, with a substantially circular portion 161 and an opening 159 defined by a forward end 163 and an aft end 165. In some embodiments, the diameter D of the circular portion 161 is larger than the width W of the opening 159 as measured from the forward to the aft end. This may increase the compliance of the hinge portion 158 while reducing undesirable aerodynamic effects of the hinge portion 158 on the airflow over the rotor blade assembly 20. For example, air may substantially pass over the opening 159 without entering or being affected by the circular portion 161. Deflection of the trailing edge flap 162 may cause the aft end 165 to move towards or away from the forward end 163. For example, when the trailing edge flap 162 is deflected downwards, the width W may decrease as the two ends 163, 165 of the opening 159 come together. In some embodiments, the two ends 163, 165 of the opening 159 may contact each other and the width W may be reduced to a negligible extent or eliminated when the trailing edge flap 162 is at a maximum downward defection.

In other embodiments of the hinge portion 158, the opening 159 may be sealed with a compliant material, such as rubber. For example, the embodiment shown in the figures may include a compliant gasket to keep air from entering the circular portion 161. In some embodiments, the circular portion 161 may be filled in with, for example, a lightweight foam material. In other embodiments, there may not be a circular portion 161, and the two ends 163, may be joined only by a compliant gasket that may keep air from entering the inner cavity of the trailing edge actuator assembly 100. In other embodiments, the forward end 163 and the aft end 165 may overlap and slide past one another as the trailing edge flap 162 deflects downward.

To allow deflection of the trailing edge flap 162, in accordance with some embodiments, the trailing edge actuator assembly 100 includes a control panel (a control flap, control member, or pivot member) 164 and one or more actuators disposed in the inner cavity 135 and configured to apply force to the to the upper and lower surfaces 174, 176 of the control panel 164. The control panel 164 is cantilevered and includes a coupled end 170, an uncoupled end 172 extending into the inner cavity 135, an upper surface 174 and a lower surface 176. The control panel 164 may be coupled at its coupled end 170 to the upper inner surface 110 of the upper actuator skin 106. The force applied to the control panel 164 may cause deflection of the control panel 164 at the uncoupled end 172 and may cause torque at the coupled end 170. In other embodiments, the control panel 164 may be coupled at its coupled end 170 to the lower inner surface 118 of the lower actuator skin 114. In some embodiments, the hinge portion 158 may be part of the upper skin 106 rather than the lower skin 114. For example, the coupled end 170 of the control panel 164 may be coupled to the lower inner surface 118 of the lower actuator skin 114, rather than to the upper inner surface 110 of the upper actuator skin 106, and the hinge portion 158 may be part of the upper skin 106, taking the shape of an inverted omega.

In various embodiments, the control panel 164 may be integrally formed with the upper actuator skin 106 or the lower actuator skin 114. The control panel 164 may be made from any appropriate material used in rotary wing aircraft blades, including, for example, titanium, aluminum, stainless steel, carbon fiber, fiberglass or any combination thereof. For example, the control panel 164 may be made from may be made from the same or similar materials as the actuator skins 106, 114. The control panel 164 may extend substantially along the entire length of the trailing edge actuator assembly 100. The actuators may be, for example, jack screws, hydraulic or pneumatic cylinders, or dynamic diaphragms such as upper diaphragm 166 and lower diaphragm 168. When the actuators are diaphragms, the diaphragms may extend substantially along the entire length of the control panel 164.

The diaphragms 166, 168 shown in FIG. 5, for example, may be configured to inflate and apply pressure to (e.g., impart or apply a force on) the upper and lower surfaces 174, 176 of the control panel 164. For example, the diaphragms 166, 168 may respectively include bladders 167, 169 that can be filled with air to inflate the diaphragms 166, 168, or conversely, air may be released (discharged) to cause the diaphragms 166, 168 to deflate. In some embodiments, other gases may be used to fill the diaphragms. The diaphragms 166, 168 may be made from a compliant material (rubber, nitrile coated nylon, neoprene coated nylon, etc.) such that the diaphragms 166, 168 expand in size when inflated. For example, the lower diaphragm 168 may inflate to apply pressure to the lower surface 176 of the control panel 164 as well as the lower inner surface 118 of the lower actuator skin 114. The upper diaphragm 166 may inflate to apply pressure to the upper surface 174 of the control panel 164 as well as the upper inner surface 110 of the upper actuator skin 106. The diaphragms 166, 168 may be bonded to the surfaces 174, 176, 118, 110, for example, with epoxy. The pressure from the lower diaphragm 168 causes an upward force on the control panel 164 causing the uncoupled end 172 to deflect upward and creating torque at the coupled end 170. The torque causes the trailing edge flap 162 to deflect downward. Similarly, the upper diaphragm 166 may inflate to apply pressure to the upper surface 174 of the control panel 164 as well as the upper inner surface 110 of the upper actuator skin 106. The pressure from the upper diaphragm 166 causes a downward force on the control panel 164 causing the uncoupled end 172 to deflect downward and creating torque at the coupled end 170. The torque causes the trailing edge flap 162 to deflect upward.

As discussed above, downward deflection of the trailing edge flap 162 provides an airfoil shape that improves control when the aircraft 10 is hovering, while a more upward deflection improves control in forward flight. The trailing edge flap 162 may have a "neutral" position, where the flap 162 is not being deflected in either direction by the diaphragms 166, 168. For example, the neutral position may be the position of the trailing edge flap 162 when neither diaphragm 166, 168 is inflated or when each of the diaphragms 166, 168 are inflated to similar pressures such that zero net torque is created at the coupled end 170 of the control panel 164. The neutral position may be determined based on the requirements of the particular aircraft 10 based on how the trailing edge assembly 100 is manufactured or installed. For example, in some embodiments, the neutral position may be tailored for forward flight, and the control panel 164 may only deflect the trailing edge flap 162 downward when the aircraft 10 is hovering. In other embodiments, the neutral position may be tailored for hovering, and the control panel 164 may only deflect the trailing edge flap 162 upward for forward flight. In other embodiments the neutral position may be between a desirable position for hovering and a desirable position for forward flight, and the control panel 164 may deflect the trailing edge flap 162 upward for forward flight and downward when the aircraft 10 is hovering.

In some embodiments, both diaphragms 166, 168 may be expanded (e.g., by being inflated) when the trailing edge flap 162 is in the neutral position and/or in a deflected position to reduce vibration. For example, when downward deflection is required, the pressure in the lower diaphragm 168 may be increased and/or the pressure in the upper diaphragm 166 may be decreased. However, the upper diaphragm 166 may remain inflated to stabilize the control panel by reducing or preventing additional upward deflection of the control panel 164 due to turbulence or changes in air flow. As another example, when the trailing edge flap 162 is in a neutral position, both diaphragms 166, 168 may be inflated to substantially equivalent pressures such that the forces on the upper and lower surfaces 174, 176 of the control panel 164 oppose each other and zero net torque results at the coupled end 170.

The diaphragms 166, 168 may resist upward or downward deflection of the uncoupled end 172 of the control panel 164 and provide additional stability to the trailing edge flap 162. In some embodiments, additional upper and lower diaphragms 166, 168 may be provided and aligned in series along length of the main rotor blade assembly 20. For example, if the trailing edge assembly 100 spans about sixty inches of the blade assembly length, there may be three upper diaphragms 166 and three lower diaphragms that are each about one third of the total blade assembly length (i.e., each about twenty inches in length) aligned in series.

The bladders 167, 169 shown in FIG. 5 may each be fluidly coupled to a hose and a valve to allow air in to pressurize the diaphragms 166, 168 as needed. The bladders 167, 169 may each be fluidly connected to a second valve that may allow air out of the respective bladder 167, 169. In some embodiments, pressure may be generated in one or more pumps located within the rotor blade assembly 20 and fluidly coupled to the hoses of the diaphragms 166, 168. In other embodiments, one or more pumps may be located elsewhere in the aircraft 10. The hoses of the diaphragms 166, 168 may be fluidly coupled to a pneumatic rotary union or slip ring at the rotor hub assembly H and additional hoses may couple the pneumatic rotary union or slip ring to the pump. In some embodiments, the aircraft 10 may also include one or more suction pumps.

In still other embodiments, pressure may be generated using centrifugal pumping in the rotor blade assembly 20 itself. For example, the inboard end 23 of the rotor blade assembly 20 may contain a hole that allows air to enter an inner cavity 135 of the trailing edge actuator assembly 100. Due to the rotation of the rotor blade about the axis A, air is pushed toward the outboard end 25. The inner cavity 135 is configured such that without an exit hole or with a small exit hole, air pressure accumulates in the inner cavity 135. The high pressure region may be isolated from the diaphragms 166, 168 via walls or baffles in the inner cavity 135. When a diaphragm 166, 168 is inflated, a valve may open, allowing air to flow from the high pressure region of the inner cavity 135 to the bladders 167, 169 via the coupled hoses. Similarly, centrifugal suction may be created by including a hole at the outboard portion 103 of the trailing edge actuator assembly 100. Air in the inner cavity 135 is pushed by centrifugal force out of the hole creating a low pressure region. Again, the low pressure region may be isolated from the diaphragms 166, 168 via walls or baffles in the inner cavity 135. The diaphragms 166, 168 may be fluidly coupled to the low pressure region, and a valve may be opened to release air into in the bladders 167, 169 to the low pressure region.

Figure 7:
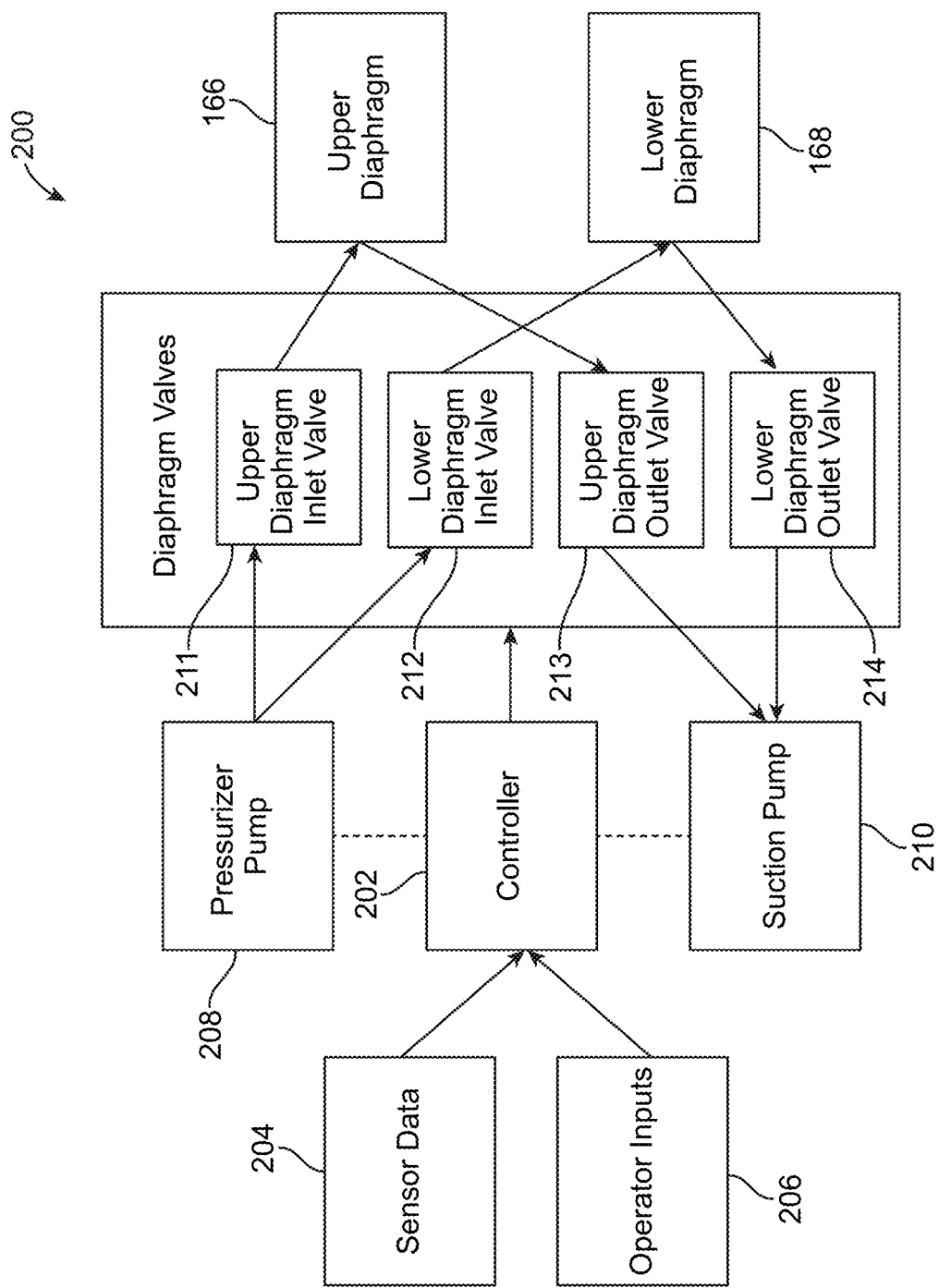
FIG. 7 is a schematic diagram of a trailing edge flap control system for a rotor blade assembly, according to an exemplary embodiment.

Referring now to FIG. 7, a schematic diagram of a trailing edge flap control system 200 of an aircraft 10 is shown, according to some embodiments. The control system 200 may be configured to adjust the deflection of the trailing edge flap 162. The control system 200 may include a controller 202 configured to receive sensor data 204 from one or more sensors (e.g., pitot tubes, accelerometers, etc.). In some embodiments, the controller 202, in addition or an alternative to receiving sensor data 204, is configured to receive operational data (e.g., user data from an operator such as a pilot or co-pilot) 206. The operational data 206 may be data generated from various operators controls associated with inputs from the pilot or co-pilot to one or more control interfaces of the aircraft 10. The operational data 206 may be data related to the cyclic control, collective control, throttle, etc. The controller 202 may determine the flight regime (e.g. forward flight, hover, etc.) of the aircraft 10. The controller 202 may then determine whether the valves 211-214 should open or close in order to achieve a target deflection angle of the trailing edge flap based on the determined flight regime, thus achieving the desired aerodynamic performance. Generally, higher target deflection angles are desirable in hover flight regimes, while lower or zero target deflection angles are desirable in forward flight regimes. Foer example, the trailing edge flap may be set at a maximum deflection angle in the hover regime. The controller 202 may send an electrical signal to each the valves 211-214 (e.g. via a wired connection to the valves, etc.) instructing each valve to open or close depending on the sensor data 204 and operator inputs 206 received. The upper diaphragm inlet valve 211 fluidly couples the upper diaphragm 166 to a pressurizer pump 208 and the lower diaphragm inlet valve 212 fluidly couples the lower diaphragm 168 to the pressurizer pump 208. The upper diaphragm outlet valve 213 fluidly couples the upper diaphragm 166 to a suction pump 210 and the lower diaphragm outlet valve 214 fluidly couples the lower diaphragm 168 to the suction pump 210.

In some embodiments, as an example of the foregoing, when an aircraft 10 slows from forward flight to a hover, the controller 202 may receive sensor data 204 and operator inputs 206. For example, the controller 202 may receive data from a pitot probe indicating an airspeed from the aircraft 10. The airspeed information taken at various times may be recorded and stored in a memory of the controller 202. Based on evaluating the different speeds as measured at different time periods, the controller 202 is configured to determine that the airspeed of the aircraft 10 has decreased. When the speed is decreased to be a threshold speed or lower, the controller 202 may determine that the aircraft 10 is entering a hover regime or that there is an intent to cause the aircraft 10 to be in a hover regime. Alternatively or in addition, the controller 202 may receive an indication that the operator has pulled back on the cyclic control, indicating the operator's intent to reduce the speed of the aircraft 10 in the forward direction. The controller 202 may then compare the received data to a flight control model stored in the memory of the controller and determine that the aircraft 10 has slowed to a hover. Thus, whether relying on the pitot probe information, the cyclic controller information, or both, the controller 202 is configured to determine a change in flight regime.

In response to detecting the change in flight regime, the controller 202 may then send signals, as described below, to the valves 211-214 that will cause the trailing edge flap 162 to deflect downward to tailor the airfoil shape for the hover regime. While the aircraft 10 remains in a steady flight regime, the controller 202 may instruct all the valves 211-214 to remain closed, holding the diaphragms 166, 168 at a steady pressure. When the controller 202 detects that the aircraft 10 has slowed to a hover, the controller 202 may instruct the lower diaphragm inlet valve to open, thus allowing pressurized air to flow from the pressurizer pump 208 into the lower diaphragm 168 to increase the pressure applied to the lower surface 176 of the control panel 164. The controller 202 may also instruct the upper diaphragm outlet valve 213 to open, allowing air to be pumped out of the upper diaphragm 166 by the suction pump 210 to reduce the pressure applied to the upper surface 174 of the control panel 164. The increased pressure on the lower surface 176 and decreased pressure on the upper surface 174 of the control panel 164 causes the trailing edge flap 162 to deflect downward to optimize the airfoil shape for the hover regime. When the trailing edge flap 162 reaches a target deflection angle (e.g. a maximum deflection angle), the controller 202 may instruct the lower diaphragm inlet valve 212 and upper diaphragm outlet valve 213 to close to maintain the airfoil shape while the aircraft 10 remains in the hover regime.

Similarly, when an aircraft 10 accelerates from a hover to forward flight, the controller may receive sensor data 204, such as pitot probe data indicating an increase in airspeed, and operator inputs 206, such as an operator pushing the cyclic control forward. The controller may then compare the received data to a flight control model stored in a memory device of the controller and determine that the aircraft 10 has accelerated to a forward flight regime. In response to detecting the change in flight regime, the controller 202 may then send signals, as described below, to the valves 211-214 that will cause the trailing edge flap 162 to deflect upward to tailor the airfoil shape for the forward flight regime. For example, the controller 202 may instruct the upper diaphragm inlet valve 211 to open to allow pressurized air into the upper diaphragm 166 and may open the lower diaphragm outlet valve 214 to release air from the lower diaphragm 168. This increases pressure on the upper surface 174 and decreases pressure on the lower surface 176 of the control panel 164, causing the trailing edge flap 162 to deflect upward. When the trailing edge flap 162 reaches a target degree of deflection, the controller 202 may instruct the lower diaphragm outlet valve 214 and upper diaphragm inlet valve 211 to close to maintain the airfoil shape while the aircraft 10 remains in the forward flight regime.

Computer Implemented Controller

The controller 202 mentioned above may be implemented via a microprocessor, processor, microcomputer or computer according to some embodiments. The controller 202 may include a processing circuit having a processor and a memory device and may be configured to communicate with one or more sensors.

In one configuration, the processing circuit may be embodied as a machine or computer-readable medium that is executable by a processor, such as processor. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device may be communicably connected to the processor to provide computer code or instructions to the processor for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

Configuration of Example Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

What is claimed is:

1. A rotor blade assembly for a rotary wing aircraft, the rotor blade assembly comprising:
   a main rotor blade body comprising an upper blade skin, a lower blade skin, an inboard end, an outboard end, and a trailing edge; and
   a trailing edge actuator assembly comprising:
      an upper actuator skin and a lower actuator skin defining a cavity and a trailing edge flap;
      a control panel disposed in the cavity and comprising:
         a coupled end coupled to an inner surface of one of the upper actuator skin or the lower actuator skin; and
         an uncoupled end extending into the cavity; and
      one or more actuators disposed in the cavity and configured to apply force to the control panel to cause the trailing edge flap to deflect, the trailing edge actuator assembly being coupled to the trailing edge of the main rotor blade body.

2. The rotor blade assembly of claim 1, wherein the one or more actuators comprise at least one inflatable diaphragm and wherein inflation of the inflatable diaphragm imparts a force on the control panel.

3. The rotor blade assembly of claim 2, wherein the at least one inflatable diaphragm comprises a first diaphragm configured to apply force to a lower surface of the control panel, wherein the force on the control panel causes the trailing edge flap to deflect downward.

4. The rotor blade assembly of claim 3, wherein the at least one inflatable diaphragm further comprises a second diagram configured to apply force to an upper surface of the control panel to reduce the downward deflection of the trailing edge flap.

5. The rotor blade assembly of claim 2, further comprising a controller configured to open and close one or more valves coupled to the at least one inflatable diaphragm to inflate or deflate the at least one inflatable diaphragm.

6. The rotor blade assembly of claim 5, wherein the controller is configured to open and close the one or more valves in response to receiving at least one of (i) sensor data from one or more sensors or (ii) operator inputs from one or more operator controls.

7. The rotor blade assembly of claim 1, further comprising a controller configured to:
receive at least one of (i) sensor data from one or more sensors or (ii) operator inputs from one or more operator controls;
detect a change in a flight regime of the rotary wing aircraft based on at least one of sensor data or operator inputs;
control, in response to detecting a change in flight regime from a forward flight regime to a hover regime, the one or more actuators to cause the trailing edge flap to deflect downward; and
control, in response to detecting a change in flight regime from the hover regime to the forward flight regime, the one or more actuators to cause the trailing edge flap to deflect upward.

8. The rotor blade assembly of claim 1, further comprising a stiffener configured to couple the trailing edge actuator assembly to the main rotor blade body and to maintain a distance between the upper blade skin and the lower blade skin.

9. The rotor blade assembly of claim 8, wherein the upper blade skin and the upper actuator skin are coupled to an upper surface of the stiffener and define a substantially contiguous upper surface of an airfoil, and wherein the lower blade skin and the lower actuator skin are coupled to a lower surface of the stiffener and define a substantially contiguous lower surface of the airfoil.

10. The rotor blade assembly of claim 9, further comprising a first set of one or more fasteners configured to couple the upper actuator skin to the stiffener and a second set of one or more fasteners configured to couple the lower actuator skin to the stiffener.

11. The rotor blade assembly of claim 10, wherein the one or more fasteners are countersunk such that a head of each fastener is substantially coplanar with a respective outer surface of the upper actuator skin or the lower actuator skin.

12. The rotor blade assembly of claim 1, wherein the control panel is coupled to one of the upper actuator skin or the lower actuator skin, and the other of the upper actuator skin or the lower actuator skin includes a hinge portion.

13. The rotor blade assembly of claim 12, wherein the hinge portion comprises a crosssection including a substantially circular portion and an opening defined by a forward end and an aft end, wherein deflection of the trailing edge flap causes the aft end to move towards or away from the forward end.

14. The rotor blade assembly of claim 13, wherein the diameter of the substantially circular portion is larger than a width of the opening measured from the forward end to the aft end.

15. The rotor blade assembly of claim 1, wherein the one or more actuators are configured to cause the uncoupled end of the control panel to deflect, the upward deflection of the control panel resulting in the downward deflection of the trailing edge flap.

16. The rotor blade assembly of claim 1, wherein the main rotor blade body comprises an opening configured to receive the trailing edge actuator assembly.

17. The rotor blade assembly of claim 1, wherein the trailing edge actuator assembly extends along at least a majority of the main rotor blade body from the inboard end to the outboard end.

18. A rotary wing aircraft comprising:
an engine configured to be coupled to a fuselage;
a main rotor system coupled to the fuselage, the main rotor system comprising:
a rotor hub configured to be rotated by the engine about an axis; and
at least one rotor blade connected to the rotor hub, the at least one rotor blade having a main blade body and a main blade body trailing edge;
an actuator assembly coupled to the main blade body trailing edge of the at least one rotor blade, each actuator assembly comprising:
an actuator assembly trailing edge configured to deflect upward and downward;
a pivot member in an internal portion of the actuator assembly, the pivot member comprising:
a coupled end coupled to the actuator assembly trailing edge; and
an uncoupled end extending into the internal portion of the actuator assembly;
one or more inflatable diaphragms configured to apply pressure to the pivot member when inflated, wherein the pressure applied to the pivot member imparts torque on the actuator assembly trailing edge causing the actuator assembly trailing edge to deflect relative to the main blade body.

19. A control system for actuating a trailing edge of a rotor blade of a rotary wing aircraft, the control system comprising:
a trailing edge control panel disposed in a cavity of the rotor blade and comprising:
a coupled end coupled to the trailing edge of the rotor blade; and
an uncoupled end extending into the cavity;
one or more actuators configured to adjust a position of the control panel so as to cause deflection of the trailing edge; and
a controller configured to:
receive at least one of sensor data from one or more sensors or operator inputs from one or more operator controls;
determine, based on the at least one of sensor data or operator inputs, a change in a flight regime of the rotary wing aircraft;

control, in response to detecting a change in flight regime from a forward flight regime to a hover regime, the one or more actuators to cause the trailing edge to deflect downward; and control, in response to detecting a change in flight regime from the hover regime to the forward flight regime, the one or more actuators to cause the trailing edge to deflect upward.

* * * * *